Jan. 23, 1951 W. G. SCHNEIDER 2,539,332
ELECTRICAL CONDENSER
Filed Dec. 22, 1947
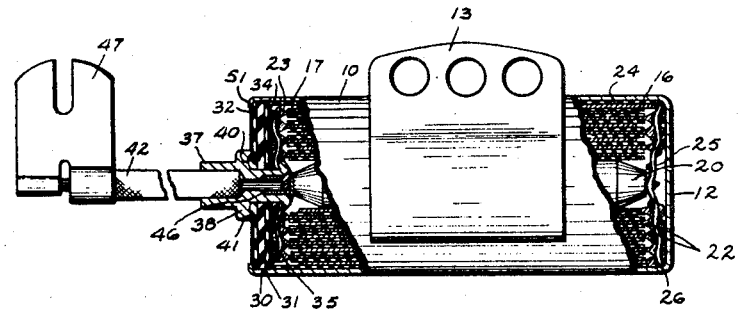
Fig. I
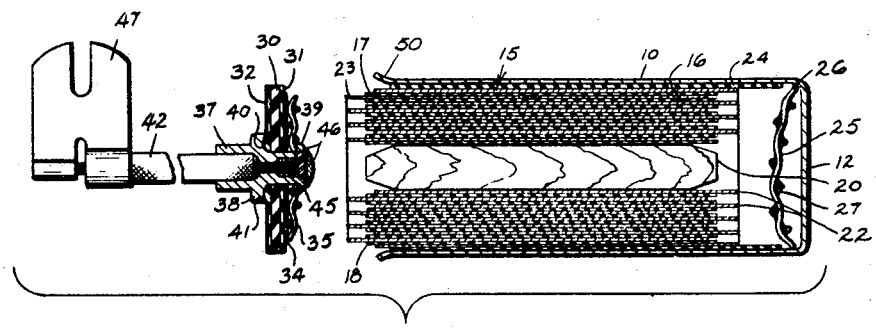
Fig. II
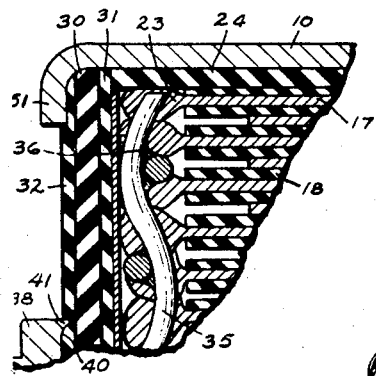
Fig. III
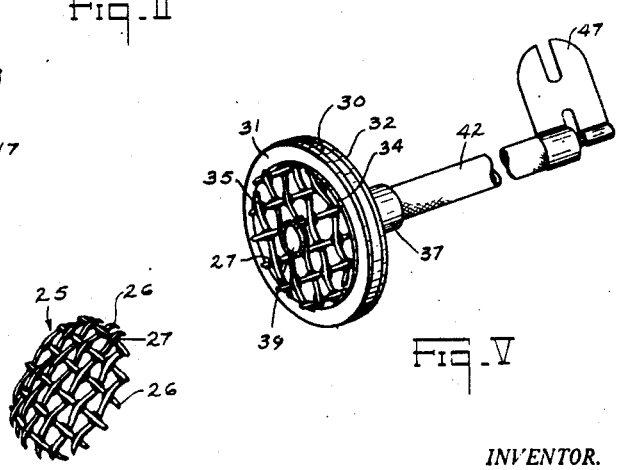
Fig. IV
Fig. V
INVENTOR.
William G. Schneider
BY
Falvey, Souther & Stoltenburg Patented Jan. 23, 1951

2,539,332

UNITED STATES PATENT OFFICE 2,539,332

ELECTRICAL CONDENSER

William G. Schneider, Maumee, Ohio

Application December 22, 1947, Serial No. 793,117

9 Claims. (Cl. 175—41)

This invention relates to electric capacitance devices and particularly to electrical condensers adapted to be used with the ignition systems for internal combustion engines.

The invention includes a novel, preformed, foraminous or meshed means for a condenser to provide and assure a very effective electrical contact between the condenser electrodes and the terminals by which connection to an outside circuit may be made.

The invention provides a condenser construction including a meshed member preformed to a configuration imparting a springiness thereto whereby the condenser body is held under compression and positive electrical contact at a plurality of points is established between the condenser body and the condenser terminals.

The invention comprehends a condenser assembly including an arrangement to insure positive and permanent contact of the condenser electrodes with the condenser terminals which will maintain the condenser assembly in moisture-proof sealing relation.

One of the objects of the invention is to provide a condenser construction in which the condenser body is supported within a container under pressure to maintain thereby a hermetically sealed and positive electric contact at a plurality of points between the condenser electrodes and the circuit terminals used therefor.

Another object of the invention resides in a condenser construction including foils of condenser material alternating with insulating means and meshed yieldable conducting means for connecting one of the foils with the casing used as a circuit terminal and another foil with a conductor terminal by causing portions of the foils to extend or project into the openings of said meshed conducting means.

Another object of the invention is to provide electric conducting bonded screen material for making contact with the condenser electrodes at a plurality of points providing a positive interwoven communication therebetween whereby the electrical resistance between the electrodes and the condenser terminals is reduced to a minimum and the same are at all times positively and firmly in electrical contact.

A further object of the invention is to provide a means and a method for causing the marginal portions of the convolutions or folds of the electrodes of a condenser to enter into firm, mechanical and electrical contact with a foraminous or meshed material thereby interconnecting at a plurality of points the condenser electrodes with the condenser circuit terminals.

Other objects and advantages of this invention relating to the arrangement, operation and function of the related elements of the structure, to various details of construction, to combinations of parts and to economies of manufacture, will be apparent to those skilled in the art upon consideration of the following description and appended claims, reference being had to the accompanying drawings forming a part of this specification wherein like reference characters designate corresponding parts in the several views.

Referring to the drawings:

Fig. I is a view in side elevation with parts broken away and shown in section to illustrate an electrical condenser embodying the invention;

Fig. II is a sectional elevation of the condenser elements before being assembled;

Fig. III is a fragmentary sectional view on an enlarged scale showing the condenser assembly at the housing closure;

Fig. IV is an isometric view showing a preferred embodiment of the preformed connecting means of the invention;

Fig. V is an isometric view of the conductor terminal assembly including the connecting means of the invention.

Referring to the drawings, 10 indicates the condenser housing or enclosure which is preferably formed of a drawn, cup-like member of some ductile conducting material such as brass or the like. The casing 10 provides a uniplanar section or flat bottom wall 12 integrally-formed therewith and has affixed to its outer surface, by brazing or other suitable fixing means, a mounting bracket 13 that also acts as one of the circuit terminals for the condenser.

The housing 10 is formed to accommodate a condenser body 15 comprising a pair of foils or electrodes of condenser material 16 and 17 interleaved by suitable dielectric spacers or insulators 18 shown as wound into a roll preferably on a non-conductive member 20. However, the same could take the form of folds or pleats, as is the usual and well-known practice. The member 20 is shown as a rod made of wood, but the member 20 could be dispensed with if desired. The electrodes 16 and 17 with a suitable number of insulators or dielectric spacers 18 are wound in slightly offset relation such that the foil or electrode 16 is disposed laterally of the center line to provide an exposed foil edge or margin 22 while the electrode 17 is offset on the opposite direction to provide the exposed foil edge or margin 23, as particularly shown in Figs. II and III. The invention also includes the use of a condenser body in which its electrodes are made of metallized dielectric material preferably in the form of webs or strips in offset relation to expose marginal foil sections.

The condenser body 15 is impregnated before its insertion into the open ended enclosure 10 and a member of insulating material 24 is wrapped around the outer surface thereof, forming thereby a suitable insulating liner between the condenser body 15 and the surrounding metallic enclosure 10. Prior to the insertion of the condenser body 15 with its insulator member 24 into the housing 10, the connecting means of the invention in the form shown in Fig. IV is placed within the housing adjacent to the bottom wall 12 to serve as an electrical connector 25 between the condenser electrode 16 and the metallic container 10.

The preferred embodiments of the connecting means of the invention are illustrated in Figs. IV and V where it is shown in the form of plates or discs of a conductive spring screen material. Fig. IV shows a type of preformation used to impart springiness or take-up force thereto where it can be seen that the electrical connecting means 25 is in the form of a mesh spherical or convex plate or disc-like member of suitable dimensions, so that the ends 26 of the spring wires, suitably bonded as at 27, snugly fit within the casing 10 contacting the walls thereof, as particularly shown in Fig. II. I have found that the invention can best be fulfilled when the connecting means is manufactured from spring wire, preferably brass of about .020 to .030 inch diameter interwoven and suitably bonded to preferably form a #10 mesh screen. However, it is understood that other conductive materials, characterized by like properties formed into a suitable mesh or foraminous member, can be used. Moreover, the size of the mesh can be varied widely as long as the apertures between the wire or members forming the screen provides a satisfactory open area to permit the projection or passage therethrough of the marginal ends or bare sections of the condenser electrodes, so that when the condenser body 15 is retained in the housing 10, the connecting means 25 provides a plurality of contacting points with the marginal sections of each of the electrodes and with the circuit terminals or lead-out conductors.

The housing 10, after the condenser body 15 with the insulator lining 24 as well as the connector 25 are inserted therein, has its open end fitted and hermetically sealed by a closure including a circuit terminal or lead-out connector. The preferred form of closure is illustrated in Figs. II and V and includes an insulating member 30, both sides of which are covered by rubber-like elements constituting inside and outside resilient layers 31 and 32. The resilient elements 31 and 32 may be of a laminated structure cemented to the rigid insulator 30 or formed by bonding soft rubber thereto by a suitable vulcanizing process forming a resiliently lined rigid insulator. The insulator 30 and the coextensive resilient elements 31 and 32 are provided with a suitable central opening forming an annular structure adapted to closely fit within the open end of the housing member 10 and are adapted to insulatingly support the connecting means of the invention and lead-out terminal assembly.

The connecting means of the invention and the lead-out terminal or circuit connector assembly, which are particularly shown in Fig. V, comprise a closure-reinforcing means or annular metallic member 34 and a foraminous connector 35, the latter fabricated of suitable mesh spring material formed as hereinbefore described of spring-conducting wire suitably bonded as at 36, preferably by a hot tin dip process. The screen connector 35 of the invention is in the form of a circular member with a central opening adapted to accommodate the tubular section of the conducting eyelet member 37. The eyelet member 37 is formed with an external flange 38 and the end of its tubular section is upset or flared as at 39 to retain the resiliently-lined, rigid insulator 30, metallic member 34, and screen connector 35 in closed nested sealed relation. The flange 38 of the eyelet member 37 is formed with an annular depression terminating into a protruding lip 41 adapted to substantially indent or be imbedded into the outside resilient rubber element 32, as particularly shown in Fig. III forming a hermetic seal between the eyelet and closure means 30.

The tubular portion of the eyelet 37 closely receives an insulated conducting lead 42 and is provided with a reduced opening adapted to accommodate the bare section 45 of the lead member which is anchored thereto by solder as at 46 forming a hermetic seal for the eyelet tubular end. The terminal clip 47 may be attached to the end of the insulated conducting lead 42 forming the other circuit terminal for the condenser.

The terminal connector assembly snugly fits the inside of the housing 10 and, for easy manufacture, the housing 10 is provided with flared end section 50. When the closure and terminal assembly are urged passing the flared section 50 of the housing 10, the connector means of the invention 35 is forcibly pressed against the foil edge or bare conducting margin 23 of the condenser electrode 17 and while it is held under compression firmly, the end of the housing 10 is spun or crimped inwardly as shown at 51 in Fig. III to thereby maintain under pressure the parts in their assembled relation. The step of forcibly urging the parts in assembled relation within the housing 10 by means of the closure assembly, which places them under a state of compression, results in a substantial amount of compression or radial flattening of the stiff, preformed, meshed member or connector 25 urging the ends 26 of the bonded mesh into positive contact with the walls of the casing 10. The take-up force exerted by the connector 25 is sufficient to act against the bottom wall 12 of the casing 10 and maintain a positive contact at a plurality of points between the bottom wall 12 and the foil bare edge 22 as well as between the metallic screen 35 and the foil bare edge 23. The reflex spring force is sufficient to positively assure that the bare ends 22 and 23 of the condenser electrodes 16 and 17 will project through the openings formed by the mesh metallic members 25 and 35 and be anchored to the spring wires to cause an electrical connection at a plurality of points with the casing as well as with the insulating conducting lead 42 forming the circuit terminals of the condenser assembly. This arrangement provides a non-inductive winding of the condenser electrodes when the same are helically wound.

The take-up force exerted by the springiness of the preformed connecting means of the invention, as manifested by the connector 25, will also press the resilient rubber lining 32 of the rigid insulator 30 against the crimped section 51 of the housing and thereby insures an absolute seal against the ingress of air and moisture either passing the eyelet lip 41 or the crimped section 51. Moreover, the presence of the metallic member 34 prevents the connector screen 35 from cutting or permanently indenting the inner lining 32 of the insulating closure 30.

It can be seen that the connecting means of the invention performs the dual function of providing a positive contact between the condenser electrodes and the conducting terminals therefor, as well as effecting a continued sealing pressure at all junctures of the condenser assembly, particularly between the condenser housing 10 and its closure assembly. Moreover, the connector member 25 of the invention serves to hold the condenser body 15 under spring pressure within the housing to thereby maintain a moisture and air seal proof condenser assembly.

It should be noted that the marginal portions or bare foil edges 22 and 23 of the condenser electrodes not only protrude or extend through the openings of the mesh connectors 25 and 35 but a certain distortion of the apertures causes the interwoven wires to tightly embrace the portions of the foils passing through the screen apertures, as is particularly illustrated in Figs. I and III, causing a distortion of the protruding condenser material and crushing some of the sections into intimate and firm engagement, enhancing thereby the area of contact of the condenser electrodes with the connecting means of the invention. This arrangement of connecting means provides a positive interwoven connection of the condenser electrodes and circuit terminals at a sufficient number of points to reduce to a minimum the overall electrical resistance of the condenser.

It is to be understood that the above detailed description of the present invention is intended to disclose an embodiment thereof to those skilled in the art, but that the invention is not to be construed as limited in its application to the details of construction and arrangement of parts illustrated in the accompanying drawings, since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What is claimed:

1. A condenser comprising, in combination, a tubular metallic case having an integral end wall, a cover for the open end of the case, a tubular body of condenser material comprising a plurality of insulated foil elements adapted to be located within the case, preformed meshed means having a configuration which imparts springiness thereto and apertured for the passage therethrough of portions of the foils for connecting one of the foil elements with the case, a terminal conductor insulated from the case and passing through the cover, meshed means for connecting the insulated terminal conductor with another of said foil elements by the protrusion of portions of the foil in the apertures of the meshed means, and means including a part of the case for attaching the cover to the case and for causing distortion of and the crushing of some of the foil sections that protrude the meshed means providing a positive interwoven connection with the preformed meshed means which connects one of said foils with the casing whereby the protruding portions of the foil element are tightly embraced by the meshed means and thereafter the cover is maintained under pressure against its attaching casing part forming thereby a hermetically sealed condenser.

2. A condenser comprising, in combination, a tubular metallic case having an integral end wall, a cover of insulating material for the open end of the case, a tubular body of condenser material comprising condenser foil strips in offset relation interleaved by dielectric means located within the case, convex resilient meshed means apertured for the projections of portions of the foil strip for connecting one of the foil strips with the case, a terminal conductor passing through the cover, meshed means having apertures for the protrusion of portions of the foil strip for connecting said terminal conductor with the other foil strip, and means including a part of the case for attaching the cover to the case and effecting the crushing of some of the foil sections that protrude the said mesh means forming a positive interwoven connection therebetween and for holding under compression the resilient meshed means whereby the take up force exerted by said resilient meshed means maintains under pressure the cover and case-attaching means forming a hermetically sealed condenser.

3. A condenser comprising, in combination, an open-ended metallic case having an end wall, a cover for the open end of the case, a body of condenser material comprising insulated condenser electrodes having bared marginal sections located within the case, a disc-like member formed of apertured meshed material to a spherical configuration having dimensions to snugly fit within the case for connecting one of the bare marginal sections with the case by the projection and the crushing over the apertured meshed means of portions of the said bare marginal sections providing a positive interwoven connection therebetween, a terminal conductor insulated from the case and passing through the cover, apertured meshed means formed to a configuration for imparting springiness thereto for connecting the insulated terminal with another of said bared marginal sections through portions projecting into said meshed means, and means including a part of the case for attaching the cover to the case and for securing under compression the apertured meshed means which connects one of the marginal sections with the insulated terminal whereby the cover and casing-attaching part are maintained under pressure providing a hermetically sealed condenser.

4. A condenser comprising, in combination, condenser body including condenser material foil strips alternating with insulating strips, a tubular metal case enclosing the condenser body, a metal terminal insulatingly attached to the case adjacent one end thereof, separable metallic members of bonded screen material apertured for the protrusion of portions of the foil strips for connecting respectively one of the foils with said terminal and another foil to another conducting terminal, one of said metallic members formed into a spherical configuration imparting springiness thereto, and means for confining said condenser body and separable metallic members within the case under compression causing distortion and crushing sections of the protruding portion of the foil strip providing a positive interwoven connection with the bonded screen member whereby the take-up force of the spherically formed metallic member holds the condenser body under pressure and an electrical contact at a plurality of points is established between the condenser body foils and the said condenser terminals.

5. In an electrical condenser comprising, in combination, a condenser body including electrodes of condenser material having bared margins which extend beyond spacing dielectric means therefor, a metallic case substantially enclosing said condenser body and having a closed end, a non-conducting cover for the other end of said case, means provided solely by the case for holding said cover in place, a metal terminal supported by the cover and having a part extending within the case, a connector of bonded screen material attached to said part of the terminal lying against the cover and being apertured for the protrusion of portions of the condenser electrodes forming contacting means at a plurality of points with one of the bare margins of a condenser electrode, and a spherically formed resilient meshed means acting as connecting means between another of the bare margins of another condenser electrode by the projection of portions of the electrode bare margins and another circuit terminal, said resilient meshed means effecting the crushing of sections of the condenser electrode bare margin which protrude said bonded screen connector forming an interwoven connection therebetween and urging the condenser body to press the cover into sealing engagement with the case producing a moist-proof condenser.

6. In an electric condenser, a connector adapted to provide electrical communication between a condenser electrode and a terminal by which connection to an outside circuit may be made, the connector comprising a member of interwoven wires with apertures between the wires for the projection therethrough of portions of the condenser electrode, the member being formed to a spherical configuration imparting springiness thereto, said member adapted to be placed under pressure causing its radial flattening and crushing some of the projecting foil portions forming an interwoven connection therebetween to thereby maintain positive engagement between the interwoven wires and the condenser electrodes.

7. A connector to provide an electrical contact between a condenser body having exposed foil ends and a terminal by which connection to an outside circuit may be made, the connector comprising a meshed member of substantially convex configuration formed of interwoven bonded spring wires having apertures between the wires for intimate and plural engagement with the foils by the protrusion of portions of the foils therethrough, the meshed member with the foil portions projecting therethrough adapted to be compressed in use whereby the foil projecting portions are crushed and the apertures are distorted causing the interwoven wires to tightly embrace the portions of the protruding foil forming an interwoven connection therebetween and, maintaining positive engagement between the meshed member and the condenser foils at a plurality of points with the condenser terminal.

8. Connectors for establishing an electrical connection between electrodes of a condenser body and terminals by which connection to an outside circuit may be made, each connector comprising a meshed member of spherical configuration made of interwoven bonded spring wires forming apertures between the wires for the passage therethrough of the condenser foil ends, the meshed members interposed between the foils and the circuit terminals and adapted to be placed under a state of compression crushing sections of the foil ends passing therethrough forming an interwoven connection therebetween when in use whereby by their reflex spring force positively contact the foils and terminals and distortion of the foil ends passing through the apertures causes the interwoven wires to tightly embrace the portions of the foils passing therethrough.

9. A member for connecting a condenser body having an exposed foil end to a metallic enclosing section, comprising interwoven bonded spring wires forming a meshed plate apertured for the projection therethrough of the foil end of the condenser, the plate being formed into a spherical configuration imparting springiness thereto and of dimensions to snugly fit within the metallic enclosing section whereby when said plate is placed under compression the ends of the wire are brought into positive engagement with the walls of the enclosing section and positive contact between the interwoven wires and the condenser electrodes is maintained through an interwoven connection therebetween caused by the crushing of the foil ends of the condenser after their projection through the apertures of the mesh plate.

WILLIAM G. SCHNEIDER.

REFERENCES CITED

The following references are of record in the file of this patent:

UNITED STATES PATENTS

| Number | Name | Date |
| --- | --- | --- |
| 1,636,328 | Sauer | July 19, 1927 |
| 1,873,042 | Rohrdanz | Aug. 23, 1932 |
| 2,162,949 | Grondahl | June 20, 1939 |
| 2,323,124 | Edmundson | June 29, 1943 |

FOREIGN PATENTS

| Number | Country | Date |
| --- | --- | --- |
| 550,955 | Great Britain | Feb. 2, 1943 |